United States Patent
Roberts et al.

(10) Patent No.: US 10,302,161 B2
(45) Date of Patent: May 28, 2019

(54) SEALING ARRANGEMENT FOR A SLIDING CALIPER

(71) Applicant: Newbridge Brake Ltd., Sheffield (GB)

(72) Inventors: Paul Roberts, Newport (GB); Jonathan Leslie Christopher Jackson, Ross on Wye (GB); Andrew Dawson, Sheffield (GB); Alexis Jonathan Randall, Llanellen Abergavenny (GB)

(73) Assignee: MEI BRAKES LIMITED, Sheffield (GB)

( * ) Notice: Subject to any disclaimer, the term of this patent is extended or adjusted under 35 U.S.C. 154(b) by 0 days.

(21) Appl. No.: 15/583,427

(22) Filed: May 1, 2017

(65) Prior Publication Data

US 2017/0335911 A1  Nov. 23, 2017

(30) Foreign Application Priority Data

May 18, 2016  (GB) .................................. 1608698.5

(51) Int. Cl.
*F16D 65/095*  (2006.01)
*F16D 65/097*  (2006.01)
(Continued)

(52) U.S. Cl.
CPC ..... *F16D 65/0973* (2013.01); *F16D 55/2265* (2013.01); *F16D 55/22655* (2013.01);
(Continued)

(58) Field of Classification Search
CPC ......... F16D 2055/007; F16D 55/22655; F16D 55/227
See application file for complete search history.

(56) References Cited

U.S. PATENT DOCUMENTS 4,685,686 A    8/1987  Weiler
4,807,725 A *  2/1989  Weiler .............. F16D 55/22655
                                                  188/196 P
(Continued)

FOREIGN PATENT DOCUMENTS

DE    19636942    3/1998
DE    10201901    8/2003
(Continued)

OTHER PUBLICATIONS

Search Report for GB1608698.5 dated Nov. 3, 2016 (4 pages).
(Continued)

*Primary Examiner* — Bradley T King
(74) *Attorney, Agent, or Firm* — Susan Paik, Esq.

(57) ABSTRACT

Sealing means are disclosed for preventing the ingress of water and dirt between a brake caliper and the carrier guide pin. At the end of the guide pin facing away from the brake carrier, a retaining clip holds a sealing bead of a sealing boot at least partially within an axial bore of the guide pin. At the end of the guide pin which faces towards the carrier, a sealing boot is provided seated on a ring which in turn is attached to the caliper. The other end of the sealing boot is attached to the guide pin, in a space between the guide pin and the ring. The sealing means at either end are compact, and provide effective sealing where there is not enough space to provide known sealing means.

20 Claims, 1 Drawing Sheet

(51) Int. Cl.
   *F16D 55/2265* (2006.01)
   *F16D 65/00* (2006.01)
   *F16J 3/02* (2006.01)
   *F16J 3/04* (2006.01)
   *F16D 55/227* (2006.01)

(52) U.S. Cl.
   CPC ....... *F16D 65/005* (2013.01); *F16D 65/0068* (2013.01); *F16J 3/02* (2013.01); *F16J 3/042* (2013.01); *F16D 55/227* (2013.01)

(56) References Cited

U.S. PATENT DOCUMENTS

| | | | |
|---|---|---|---|
| 4,832,161 A | 5/1989 | Weiler et al. | |
| 5,785,156 A | 7/1998 | Warwick et al. | |
| 2009/0000881 A1* | 1/2009 | Gasslbauer | F16D 55/22655 188/71.7 |
| 2010/0044169 A1* | 2/2010 | Farooq | F16D 55/22655 188/73.44 |
| 2011/0079470 A1* | 4/2011 | Gruber | F16D 55/2265 188/72.1 |
| 2013/0126284 A1* | 5/2013 | Reiser | F16D 55/2265 188/370 |
| 2015/0122598 A1* | 5/2015 | Lethorn | F16D 65/0087 188/73.45 |
| 2017/0234378 A1* | 8/2017 | Fischer | F16D 55/22655 188/73.45 |

FOREIGN PATENT DOCUMENTS

| | | |
|---|---|---|
| DE | 102012021690 | 5/2014 |
| JP | S5794723 | 6/1982 |
| WO | 2013/174964 | 11/2013 |

OTHER PUBLICATIONS

European search report for Application No. 17168356.8 dated Sep. 26, 2017 (7 pages).
European search report for Application No. 17168446.7 dated Sep. 26, 2017 (7 pages).
Search Report for Application No. GB1608698.5 dated May 19, 2017 (2 pages).
European search report for Application No. 17168356.8 dated Aug. 27, 2018 (3 pages).

* cited by examiner

SEALING ARRANGEMENT FOR A SLIDING CALIPER

CROSS REFERENCE TO RELATED APPLICATION

This application claims the benefit of priority from GB Patent Application No. GB 1608698.5 filed on May 18, 2016, the contents of which are incorporated by reference.

TECHNICAL FIELD OF THE INVENTION

The present invention relates to a sealing arrangement for a sliding caliper disc brake, particularly an air disc brake for a large road vehicle.

BACKGROUND OF THE INVENTION

In a sliding caliper disc brake, the brake pad on one side moves with respect to the caliper, towards the disc, when the brake is actuated and with pad wear. The brake pad on the other side of the disc is fixed relative to the caliper. To provide a clamping force to both sides of the disc, the whole caliper moves axially relative to the brake disc, when the brake is actuated, to bring the brake pad which is fixed to the caliper into contact with the brake disc. The whole caliper also moves axially relative to the brake disc to allow for wear of the pad and disc.

To allow this to happen, the caliper is typically mounted onto a brake carrier by means of two guide pins with bushes. The guide pins are bolted to the brake carrier, and run in bushes within bores in the brake caliper. The guide pin arrangement should be sealed, ideally at both ends, to protect against water and dirt ingress from the road. However, due to the very limited space available in some vehicles, it is often not possible to provide good sealing whilst allowing for caliper movement to adjust for pad and disc wear.

In particular, a common design for a sliding caliper brake includes a long guide pin and a short guide pin. The long guide pin slides entirely within a bore in the caliper, which is long enough to surround the guide pin over the full range of movement of the caliper due to pad and disc wear. One end of the bore can therefore be closed by a protective cap, substantially preventing ingress of dirt. However, the shorter guide pin generally slides within a short through-bore in the caliper, where a shorter guide pin is required to prevent fouling with other vehicle components. The shorter guide pin passes all the way through the caliper and protrudes from the other side in the new pad condition, but when the pads wear the caliper slides away from the carrier, so any protective cap may intrude into other vehicle components in the worn pad condition. In this situation it is impossible to install a protective cap over the entire bore.

One way in which partially sealing the short guide pin has been attempted is to provide a wiper seal. This does not stop dirt from collecting on the exposed surface of the guide pin, thereby initiating corrosion of the guide pin, but hopefully limits the amount of dirt which can ingress between the outer surface of the guide pin and the inner surface of the bore in the caliper. However, this is only of limited effectiveness, and the presence of the wiper seal increases the frictional resistance to the guide pin sliding within the bore. Also, to achieve an acceptable service life, the guide pin has to be made from expensive stainless steel to inhibit corrosion.

Another partially-effective way of sealing the short guide pin is to provide a rolling boot which is fixed to the interior of the caliper bore at one end, and extends away from the bore. The rolling boot includes a sealing bead at the other end which is fixed to the extreme end of the guide pin. This is done by seating the sealing bead around the end of the guide pin, and then pushing a metal retaining ring into the counterbore of the guide pin, which is provided for bolting the guide pin onto the brake carrier. However, the metal retaining ring is prone to corrosion, and in extremes of movement the sealing bead can come loose from between the retaining ring and the end of the guide pin. The sealing system relies on a frictional press fit between the outer surface of the retaining ring and the inner surface of the counterbore to prevent the retaining ring from coming loose, and therefore the surface area of contact is ideally maximised. The retaining ring is therefore designed to be long enough to push up against the guide pin bolt, but the sealing performance can then be affected by manufacturing tolerances in the bolt. Very well controlled manufacturing tolerances in the bolt, the retaining ring and the bore are required for the press fit to work well.

Sealing the guide pin assembly at the outboard end (i.e. the end nearest the brake carrier) can also present difficulties. This is essentially because the clearance between the brake carrier and the caliper can be very limited. Where there is space, a rubber boot can be provided at the outboard end between the caliper and the guide pin. This forms an effective seal and is often provided on the longer of the two guide pins. However, for the short guide pin there is often not enough space to provide the known rubber boot arrangement. This end of the short guide pin is therefore often left unsealed which reduces reliability and service life.

It is an object of the invention to provide effective sealing arrangements for sliding caliper guide pins, where there is limited space.

SUMMARY OF INVENTION

According to a first aspect of the present invention, there is provided a sliding caliper disc brake arrangement comprising:
  a brake carrier having a guide pin;
  a brake caliper having a bore to receive the guide pin;
  a sealing boot for sealing between the guide pin and the caliper, on the side of the caliper facing away from the carrier, the sealing boot having a caliper sealing end portion which is disposed between the outer wall of the guide pin and the inner wall of the caliper bore and is fixed to the inner wall of the caliper bore, an elastomeric collapsible mid portion, and a guide pin sealing end portion having a sealing bead; and
  a retaining clip for holding the sealing bead of the sealing boot to the guide pin, the retaining clip being fixed to the guide pin and including at least a retaining ring overlying a circumferential periphery of the end of the guide pin which faces away from the carrier,
the guide pin being provided with an axial bore extending from the end of the pin facing away from the carrier, at least part way through the guide pin, the sealing bead of the sealing boot being held by the retaining clip at least partly within the axial bore.

Because the sealing bead is held at least partly within the axial bore, it is less prone to work loose than in prior art designs where the bead is compressed between the retaining ring and the end of the guide pin. Also, the length required for sealing is minimised. The retaining ring may overlie the end of the guide pin with a clearance sufficient to allow part of the elastomeric mid portion of the sealing boot to pass between the ring and the guide pin, but too small to allow the sealing bead to pass through. Preferably, there is enough clearance between the retaining ring and the end of the guide pin to avoid compressing the mid portion of the sealing boot.

Preferably, the retaining clip is in the form of a protective cap which substantially covers the entrance of the axial bore of the guide pin. The protective cap may be substantially circular and a circumferential periphery of the cap may provide the retaining ring.

A recess, most preferably in the form of a groove, may be provided in the internal wall of the axial bore of the guide pin. The recess may accept resilient clips which hold the retaining clip onto the guide pin. As an alternative, a circumferential detent or other protrusion might be provided on the internal wall of the axial bore, instead of a groove. However, a recess or groove is most preferable because it does not obstruct other parts, for example a guide pin bolt, during assembly.

Preferably, the retaining clip is made from plastics. A plastic cap can be formed integrally in one piece, including any resilient clips. Plastic also does not corrode.

The guide pin may be fixed to the rest of the carrier by means of a guide pin bolt which is introduced from the end of the guide pin facing away from the carrier. The axial bore of the guide pin may therefore be a counterbore of the bolt hole, the head of the bolt being received within the counterbore. At least enough space needs to be left in the bore for any parts of the retaining clip which sit within the bore, as well as at least part of the sealing bead. Preferably, when the retaining clip is fitted, there is a gap between the retaining clip and the head of the guide pin bolt. This means that manufacturing tolerances in terms of the length of the bolt will not prevent secure fastening of the retaining clip onto the guide pin.

The retaining clip may include a groove adjacent to the retaining ring for receiving the sealing bead. In other words, the retaining clip may extend into the bore of the guide pin from the retaining ring and may include a secondary ring, the sealing bead being located in a groove between the retaining ring and the secondary ring. This allows the sealing bead to be easily located during assembly.

The sealing bead may have an angled profile, for example it may form a trapezoidal ring. An angled profile and in particular a trapezoidal ring allows the bead to be more effectively held between the retaining ring and the guide pin.

The axial bore may be provided with a countersink or counterbore to form a widened mouth portion of the bore. As set out above, in some cases the axial bore will itself be a counterbore, for example of a bolt hole. However, a further countersink or counterbore may provide the widened mouth. The portion of the sealing bead which sits within the axial bore may sit within the widened mouth.

The widened mouth will effectively reduce the thickness of the guide pin wall towards the end of the guide pin. This reduced thickness creates a cavity in which the sealing bead may sit, surrounded by the retaining ring, secondary ring, other parts of the retaining clip, and the wall of the guide pin.

According to a second aspect of the present invention, there is provided a sliding caliper disc brake arrangement comprising:
 a brake carrier having a guide pin;
 a brake caliper having a bore to receive the guide pin; and
 a sealing boot for sealing between the caliper and the guide pin, on the side of the caliper facing towards the carrier, the sealing boot including a caliper sealing end portion having a sealing bead, an elastomeric collapsible mid portion and a guide pin sealing end portion having an integral retainer fixing the boot to the guide pin.

In known designs, the sealing bead is provided in a groove on the guide pin and the integral retainer is fixed to the caliper. In the invention, the sealing bead seals against the caliper and the integral retainer is fixed to the guide pin. This makes for a more compact sealing arrangement, since the guide pin sealing end can contact the guide pin substantially adjacent to the body of the carrier, with the integral retainer running back along the guide pin, away from the carrier.

Preferably, a seat for the sealing bead is provided in the form of a grooved ring which is fixed to the caliper and surrounds part of the guide pin, at the end facing the carrier.

The groove of the ring, which provides the seat for the sealing bead, preferably faces radially away from the guide pin. The sealing bead may sit in the groove, with the collapsible elastomeric mid portion of the sealing boot extending radially away from the guide pin immediately adjacent to the sealing bead. The elastomeric mid portion will typically have multiple folds, but in general it is looped back towards the guide pin so that the integral retainer can be fixed to the guide pin, substantially adjacent the carrier.

Preferably, there is a space between the grooved ring and the guide pin, and the integral retainer of the boot passes along the outer surface of the guide pin, away from the carrier, in the space between the guide pin and the grooved ring.

The whole assembly, including the grooved ring, sealing boot and integral retainer sits in the small space between the caliper and the carrier. Because the integral retainer passes along the guide pin, underneath the seat for the sealing bead at the other end of the boot, the arrangement is highly compact, and allows even very closely spaced sliding caliper arrangements to be properly sealed at the end of the guide pin, facing the carrier.

The first aspect of the invention provides an improved compact seal at the end of the guide pin facing away from the carrier, and the second aspect of the invention provides an improved compact seal at the end of the guide pin facing towards the carrier. It will be appreciated that the first and second aspects, including preferable or optional features, may be used in combinations to provide a sliding caliper guide pin which is effectively sealed at both ends.

BRIEF DESCRIPTION OF THE DRAWINGS

For a better understanding of the invention, and to show more clearly how it may be carried into effect, a preferred embodiment will now be described with reference to the accompanying drawings, in which.

DETAILED DESCRIPTION

Figure 1:
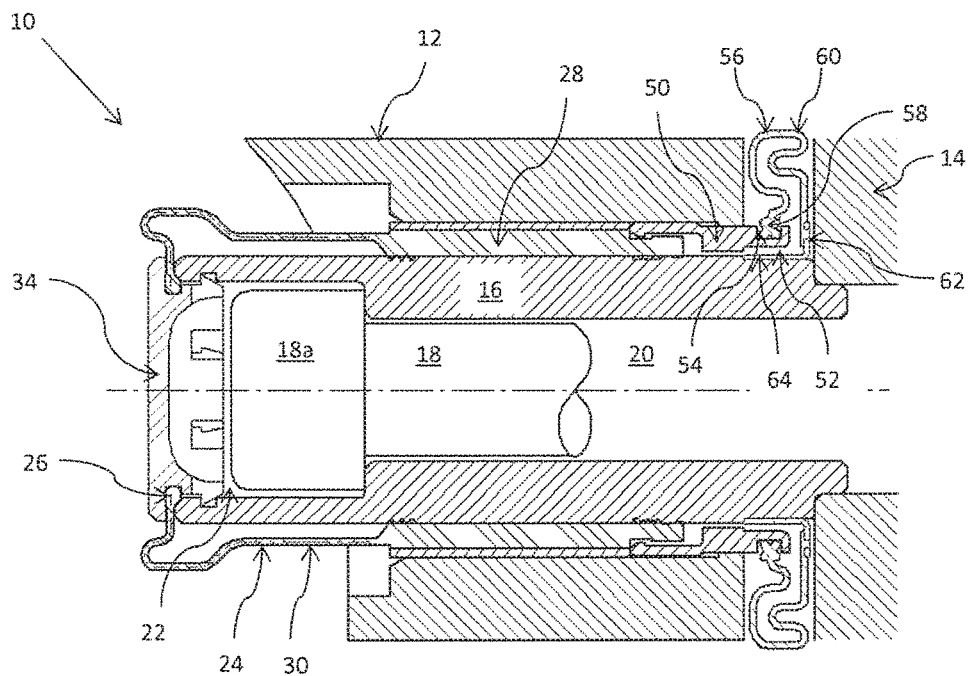
FIG. 1 is a cross-section of a sliding caliper arrangement incorporating the first and second aspects of the invention.

Referring firstly to FIG. 1, part of a sliding caliper air disc brake is indicated generally at 10. The brake includes a caliper 12 and a carrier 14. A guide pin 16 is bolted to the carrier by means of guide pin bolt 18. Note that although the bolt 18 is shown cut-away in the Figure, in fact it passes all the way through bolt hole 20 in the guide pin 16 to fix the guide pin 16 to the carrier 14. A counterbore 22 is provided in the end of the guide pin 16 facing away from the carrier 14. The counterbore 14 receives the head 18a of the bolt 18.

The guide pin is substantially cylindrical and extends away from the carrier 14, to the left in the Figure. When installed on a vehicle, this is usually the direction towards the centre of the vehicle.

Only a small portion of the caliper 12 is shown in the drawings. The caliper 12 includes a bore which receives the guide pin 16 which in turn is bolted to the carrier 14. When the brake pads wear, the caliper 12 slides relative to the carrier 14 (and the guide pin 16) in a direction away from the carrier 14, to the left in FIG. 1. When new brake pads are fitted, the caliper will return to its original position by sliding on the pin in the other direction, to the right in FIG. 1.

To prevent the ingress of water and dirt onto the outer surface of the guide pin 16, and in particular to keep clean the space between the outer surface of the guide pin 16 and the inner surface of the caliper bore, a sealing arrangement is provided at each end.

The sealing arrangement on the end of the guide pin 16 which faces away from the carrier 14 will be described first. The seal is provided by a rolling boot 24. The rolling boot includes a sealing bead 26 which is attached and sealed to the retaining cap 34 which attaches to the end of the guide pin 16, and a caliper sealing end portion 28 which is attached and sealed to the interior wall of the caliper bore. Between the sealing bead 26 and the caliper sealing end portion, an elastomeric mid-section 30 is provided. The elastomeric mid-section 30 is shown in its extended position, which would be the case when the brake has new pads, but when the brake pads wear and the caliper 12 slides away from the carrier 14, the elastomeric mid-section 30 of the rolling boot 24 will collapse. The rolling boot 24 therefore provides an extensible and collapsible seal between the guide pin 16 and the caliper 12.

Figure 2:
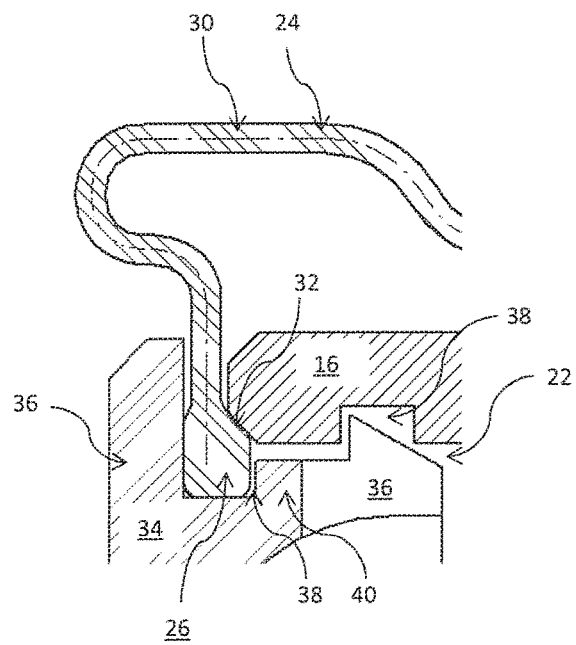
FIG. 2 is an expanded view of the cross-section of FIG. 1, showing the sealing bead arrangement on the end of the guide pin which faces away from the carrier.

With reference also to the expanded view in FIG. 2, the arrangement at the guide pin end of the sealing boot will now be described. The sealing bead 26 of the sealing boot 24 sits partially inside the bore 22 of the guide pin 16, in a countersunk mouth 32 of the bore 22. The sealing bead 26 is held in place in the countersunk mouth 32 by a retaining cap 34. The retaining cap is made from plastic, and includes a resilient clip section 36 which clips into an internal groove 38 of the guide pin 16. With the retaining cap 34 fitted, the sealing bead 26 is held between the retaining cap 34 and the wall of the guide pin 16. The sealing bead 26 has an angled trapezoidal section which ensures a tight fit. When the retaining cap 34 is fitted, there is a space between the retaining cap and the guide pin wall which is large enough to allow the elastomeric mid-section 30 of the sealing boot 24 to pass through, but which is too small for the sealing bead 26 to pass through. The sealing bead is therefore retained.

The plastic cap 34 includes a solid substantially circular barrier for preventing ingress of any dirt into the bore 22 of the caliper. It is the outer circumferential periphery of the circular barrier which forms a ring or lip 36 to retain the sealing bead 26 to the guide pin 16. As best seen in FIG. 2, a groove 38 is provided immediately adjacent to the lip 36, and a secondary ring 40 adjacent to the groove 38. The sealing bead 26 sits in the groove 38, between the retaining ring/lip 36 and the secondary ring 40.

The arrangement provides for effective and compact sealing on the end of the guide pin which faces away from the carrier.

The arrangement at the end of the guide pin which faces the carrier will now be described. A ring 50 is fixed to the caliper 12 and extends out of the bore 22 of the caliper at the end of the caliper 12 facing the carrier 14. The ring 50 substantially surrounds a small part of the guide pin 16. The part of the ring 50 which is adjacent to, but just outside the caliper 12 is disposed to provide a clearance gap 52 between the ring 50 and the guide pin 16. On the side of the ring facing radially away from the guide pin 16, a groove 54 is provided. The groove 54 receives a sealing bead 58 of a second elastomeric sealing boot 56.

The second elastomeric sealing boot 56 has a sealing bead 58, an elastomeric collapsible mid-section 60, and a guide pin sealing end portion 62. The guide pin sealing end portion is provided with a bonded metal retainer 64 for fixing the sealing boot 56 to the guide pin 16.

In FIG. 1, the brake is shown in the new pad condition position with the caliper 12 pulled towards the carrier 14. The mid-section 60 of the second sealing boot 56 is therefore collapsed, but when the brake pads wear (i.e. the caliper moves to the left in FIG. 1) the sealing boot will extend and retain the seal as the parts move.

The guide pin sealing end portion 62 of the sealing boot 56 contacts the guide pin substantially adjacent to the carrier 14. The metal retainer 64 is provided as a right angle section and runs back along the outside wall of the guide pin, away from the carrier and between the guide pin 16 and the ring 60, in the clearance space 52. This provides for an extremely compact seal, which is effective to prevent ingress of water and dirt even in designs where the caliper 12 must be disposed very close to the carrier 14.

The arrangement described may be used to seal both the guide pins on a typical sliding caliper disc brake. Alternatively, in designs which have a short guide pin and a long guide pin, the arrangement of the invention may be used to seal the short pin, with known techniques being employed to seal the long pin.

The embodiments described above are provided by way of example only, and various changes and modifications will be apparent to persons skilled in the art without departing from the scope of the present invention as defined by the appended claims.

The invention claimed is:

1. A sliding caliper disc brake arrangement comprising:
a brake carrier having a guide pin;
a brake caliper having a bore to receive the guide pin;
a sealing boot for sealing between the guide pin and the caliper, on the side of the caliper facing away from the carrier, the sealing boot having a caliper sealing end portion which is disposed between the outer wall of the guide pin and the inner wall of the caliper bore and is fixed to the inner wall of the caliper bore, an elastomeric collapsible mid portion, and a guide pin sealing end portion having a sealing bead; and
a retaining clip for holding the sealing bead of the sealing boot to the guide pin, the retaining clip being fixed to the guide pin and including at least a retaining ring overlying a circumferential periphery of the end of the guide pin which faces away from the carrier,
the guide pin being provided with an axial bore extending from the end of the pin facing away from the carrier, at least part way through the guide pin, wherein the sealing bead of the sealing boot is held by the retaining clip at least partly within the axial bore, and wherein a recess is provided in an internal wall of the axial bore of the guide pin, for accepting resilient clips to hold the retaining clip onto the guide pin.

2. A sliding caliper disc brake arrangement as claimed in claim 1, in which the retaining ring overlies the end of the guide pin with a clearance between the retaining ring and the end of the guide pin which is greater than or equal to the thickness of the mid portion of the sealing boot but less than the thickness of the sealing bead of the sealing boot.

3. A sliding caliper disc brake arrangement as claimed in claim 1, in which the retaining clip is in the form of a protective cap which substantially covers an entrance of the axial bore of the guide pin.

4. A sliding caliper disc brake arrangement as claimed in claim 1, in which the recess is in the form of a circumferential groove in the internal wall of the axial bore.

5. A sliding caliper disc brake arrangement as claimed in claim 1, in which the retaining clip is formed in one piece.

6. A sliding caliper disc brake arrangement as claimed in claim 1, in which the guide pin is fixed to the carrier by means of a guide pin bolt which is introduced through a bolt hole in the guide pin from the end of the guide pin facing away from the carrier.

7. A sliding caliper disc brake arrangement as claimed in claim 6, in which the axial bore of the guide pin is a counterbore of the bolt hole.

8. A sliding caliper disc brake arrangement as claimed in claim 7, in which a head of the guide pin bolt is disposed within the counterbore.

9. A sliding caliper disc brake arrangement as claimed in claim 8, in which there is a gap between the retaining clip and the head of the guide pin bolt.

10. A sliding caliper disc brake arrangement as claimed in claim 1, wherein the retaining clip includes a groove adjacent to the retaining ring, for receiving the sealing bead.

11. A sliding caliper disc brake arrangement as claimed in claim 1, wherein the axial bore is provided with a countersink or counterbore to form a widened mouth portion of the bore.

12. A sliding caliper disc brake arrangement as claimed in claim 11, in which at least part of the sealing bead is disposed within the widened mouth portion of the bore.

13. A sliding caliper disc brake arrangement comprising:
a brake carrier having a guide pin;
a brake caliper having a bore to receive the guide pin; and
a sealing boot for sealing between the caliper and the guide pin, on the side of the caliper facing towards the carrier, the sealing boot including a caliper sealing end portion having a sealing bead, an elastomeric collapsible mid portion and a guide pin sealing end portion having an integral retainer fixing the boot to the guide pin, wherein
a seat for the sealing bead is provided in the form of a grooved ring which is fixed to the brake caliper and surrounds part of the guide pin, at the end facing the carrier,
wherein a space is provided between the grooved ring and the guide pin, and
wherein the integral retainer of the boot passes along the outer surface of the guide pin, away from the carrier, in a space between the guide pin and the grooved ring.

14. A sliding caliper disc brake arrangement as claimed in claim 13, wherein the guide pin sealing end of the sealing boot contacts the guide pin substantially adjacent to a body of the carrier.

15. A sliding caliper disc brake arrangement as claimed in claim 14, in which the integral retainer runs from the point of contact with the guide pin, back along the guide pin, in the direction away from the carrier.

16. A sliding caliper disc brake arrangement as claimed in claim 13, wherein the groove of the ring faces radially away from the guide pin.

17. A sliding caliper disc brake arrangement comprising:
a brake carrier having a guide pin;
a brake caliper having a bore to receive the guide pin;
a sealing boot for sealing between the guide pin and the caliper, on the side of the caliper facing away from the carrier, the sealing boot having a caliper sealing end portion which is disposed between the outer wall of the guide pin and the inner wall of the caliper bore and is fixed to the inner wall of the caliper bore, an elastomeric collapsible mid portion, and a guide pin sealing end portion having a sealing bead; and
a retaining clip for holding the sealing bead of the sealing boot to the guide pin, the retaining clip being fixed to the guide pin and including at least a retaining ring overlying a circumferential periphery of the end of the guide pin which faces away from the carrier,
the guide pin being provided with an axial bore extending from the end of the pin facing away from the carrier, at least part way through the guide pin, wherein the sealing bead of the sealing boot is held by the retaining clip at least partly within the axial bore,
wherein the guide pin is fixed to the carrier by means of a guide pin bolt which is introduced through a bolt hole in the guide pin from the end of the guide pin facing away from the carrier,
wherein the axial bore of the guide pin is a counterbore of the bolt hole,
wherein a head of the guide pin bolt is disposed within the counterbore, and
wherein there is a gap separating the retaining clip and the head of the guide pin bolt so that the retaining clip is not in contact with the guide pin bolt.

18. The sliding caliper disc brake arrangement as claimed in claim 17, wherein the retaining ring overlies the end of the guide pin with a clearance between the retaining ring and the end of the guide pin which is greater than or equal to the thickness of the mid portion of the sealing boot but less than the thickness of the sealing bead of the sealing boot.

19. The sliding caliper disc brake arrangement as claimed in claim 17, wherein the retaining clip is in the form of a protective cap which substantially covers an entrance of the axial bore of the guide pin.

20. The sliding caliper disc brake arrangement as claimed in claim 17, wherein a recess is provided in the internal wall of the axial bore of the guide pin, for accepting resilient clips to hold the retaining clip onto the guide pin.

\* \* \* \* \*